(12) United States Patent
Red et al.

(10) Patent No.: US 9,122,817 B2
(45) Date of Patent: Sep. 1, 2015

(54) COLLABORATIVE CAX APPARATUS AND METHOD

(75) Inventors: Walter Edward Red, Provo, UT (US); Charles Gregory Jensen, Provo, UT (US); Jordan David Ryskamp, Spanish Fork, UT (US)

(73) Assignee: Brigham Young University, Provo, UT (US)

( * ) Notice: Subject to any disclaimer, the term of this patent is extended or adjusted under 35 U.S.C. 154(b) by 37 days.

(21) Appl. No.: 13/156,453

(22) Filed: Jun. 9, 2011

(65) Prior Publication Data

US 2012/0317497 A1 Dec. 13, 2012

(51) Int. Cl.
*G06F 3/00* (2006.01)
*G06F 17/50* (2006.01)

(52) U.S. Cl.
CPC ............ *G06F 17/50* (2013.01); *G06F 2217/04* (2013.01)

(58) Field of Classification Search
None
See application file for complete search history.

(56) References Cited

U.S. PATENT DOCUMENTS

| | | | |
|---|---|---|---|
| 6,877,027 B1 | 4/2005 | Spencer et al. | |
| 7,143,136 B1 | 11/2006 | Drenan et al. | |
| 7,176,942 B2 | 2/2007 | Chartier et al. | |
| 7,546,360 B2 | 6/2009 | Chiroglazov et al. | |
| 7,818,679 B2 | 10/2010 | Clarke | |
| 7,840,596 B2 | 11/2010 | Geyer et al. | |
| 8,327,278 B2 * | 12/2012 | Knight et al. | 715/753 |
| 8,762,941 B2 * | 6/2014 | Loberg | 717/116 |
| 2004/0085354 A1 * | 5/2004 | Massand | 345/751 |
| 2005/0165859 A1 | 7/2005 | Geyer et al. | |
| 2006/0023969 A1 * | 2/2006 | Lara et al. | 382/309 |
| 2006/0250418 A1 | 11/2006 | Chartier et al. | |
| 2006/0265496 A1 | 11/2006 | Freitag | |
| 2007/0091119 A1 * | 4/2007 | Jezyk et al. | 345/619 |
| 2007/0208994 A1 * | 9/2007 | Reddel et al. | 715/512 |
| 2008/0046828 A1 * | 2/2008 | Bibliowicz et al. | 715/751 |
| 2009/0199090 A1 * | 8/2009 | Poston et al. | 715/255 |
| 2010/0083136 A1 * | 4/2010 | Komine et al. | 715/753 |
| 2010/0121614 A1 * | 5/2010 | Reghetti et al. | 703/1 |
| 2011/0119638 A1 * | 5/2011 | Forutanpour | 715/863 |
| 2011/0126099 A1 * | 5/2011 | Anderson et al. | 715/704 |
| 2011/0145760 A1 * | 6/2011 | Radet et al. | 715/810 |

OTHER PUBLICATIONS

Michael Ryba/Utz Baitinger, An Integrated Concept for Design Project Planning and Design Flow Control, EURO-DAC '96/EURO-VHDL '96 Proceedings of the Conference in European Design Automation, 1996, 98-103, Stuttgart/Germany.

J. Y. H. Fuh/W. D. Li, Advances in Collaborative CAD: The State of the Art, Computer-Aided Design, 2005, 571-581, 37(5), Singapore/Singapore.

(Continued)

*Primary Examiner* — Matt Kim
*Assistant Examiner* — Hua Lu
(74) *Attorney, Agent, or Firm* — Kunzler Law Group

(57) ABSTRACT

A method for collaborative editing an electronic model of a CAx object may include providing access to an electronic model that is spatially decomposed into a plurality of editing regions, enabling a user to make changes to an editable feature corresponding to a particular editing region and blocking the user from making changes to an editable feature corresponding to an editing region assigned to another user. A corresponding apparatus may comprise one or more software modules and associated hardware that are configured to execute the described method.

33 Claims, 7 Drawing Sheets

(56) References Cited

OTHER PUBLICATIONS

Min Li/ Shuming Gao/Charlie C. L. Wang, Real Time Collaborative Design with Heterogenous CAD Systems Based on Neutral Modeling Commands, Journal of Computing and Information Science in Engineering. 2007, 113-125, vol. 7, Singapore/Singapore.

R.K. Thomas and R.S. Sandhu. Task-based Authorization Controls (TBAC): A Family of Models for Active and Enterprise-oriented Authorization Management. Proceedings of the IFIP WG11.3 Workshop on Database Security, Lake Tahoe, California, Aug. 11-13, 1997.

M. Li, S. Gao, C.C.L. Wang. Real-Time Collaborative Design With Heterogeneous CAD Systems Based on Neutral Modeling Commands. Journal of Computing and Information Science in Engineering June 2007, vol. 7 / 113.

L. Shen, Y. Hao, M. Li, W. Zhao, J. Zheng. A Synchronous Collaborative Environment for Engineering Design Education. Proceedings of the 2007 11th International Conference on Computer Supported Cooperative Work in Design.

T. Kim, C. Cera, W. Regli, H. Choo, J. Han. Multi-Level modeling and access control for data sharing in collaborative design. Advanced Engineering Informatics 20 (2006) 47-57.

D.Y. Zhang, L. Wang, Y. Zeng. Secure Collaborative Product Development: a Literature Review. International Conference on Product Lifecycle Management. Proc. 5th International Conference on Product Lifecycle Management (PLM 2008), Jul. 9-11, 2008.

S. Wei, M. M Tiegiang, L. Tao. Constraint Conversion Method in Feature-Based Heterogenous CAD Model Exchange. Information Technology Journal (2008).

C.M. Hoffmann and R. Juan, Erep, An Editable, High-Level Representation for Geometric Design and Analysis. In: P Wilson, M Wozny and MJ Pratt, Editors, Geometric and Product Modelling, North Holland (1993), pp. 129-164.

D. Janaki Ram, Vivekananda, Ch. S. Rao and K. Mohan, Constraint Meta-object: a New Object Model for Distributed Collaborative Designing, IEEE Transactions on Systems, Man and Cybernetics (Part A), 27(2), 208-221 (Mar. 1997).

S. Jing, F. He, S Han, X Cai, H Lui. A Method for Topological Entity Correspondence in a Replicated Collaborative CAD System. Computers in Industry. to appearing, article in press, available online Mar. 17, 2009.

B. Xu, Q. Gao, and C. Li, Reusing Single-User Applications to Create Collaborative Multi-Member Applications, Advances in Engineering Software, vol. 40, Issue 8, Aug. 2009, pp. 618-622.

G. Wallace et al., A Multicursor X Window Manager Supporting Control Room Collaboration, tech. report TR-707-04, Dept. of Computer Science, Princeton Univ., 2004.

M. Sharma, V. Raja, T. Fernando. Collaborative Design Review in a Distributed Environment. Intelligent Production Machines and Systems. D.T. Pham, E.E. Eldukhri, and A.J. Soroka (eds). Cardiff University (2006).

O. Matviykiv, M. Lobur, O. Lebedeva. Virtual Collaborative Design Environment for Distributed CAD Systems. CADSM'2007, Feb. 20-24, 2007, Polyana, Ukraine.

Caligari Truespace 7.5 Website window (2011).

Fahdah, I. And Tizani, W., 2008. "Communication and Concurrency Approach for a Real-time Collaborative Building Design Environment" in: Rafiq, Y., De Wilde, P. And Borthwick, M., eds., Intelligent Computing in Engineering: Conference Proceedings 2008 University of Plymouth., pp. 283-291.

Meng, X, Liu, X, and Xu, Y, "Real-Time Collaborative Design System for Product Assembly Over the Internet", IFIP International Federation for Information Processing, 2006, vol. 220, Information Technology for Balanced Manufacturing Systems ed. Shen, W., (Boston; Spring), pp. 253-260.

\* cited by examiner

COLLABORATIVE CAX APPARATUS AND METHOD

BACKGROUND OF THE INVENTION

1. Field of the Invention

The claimed invention relates to computer aided technologies (CAx) such as computer aided design, engineering, analysis and manufacture in general and means and methods for collaborative CAx in particular.

2. Description of the Related Art

Currently available CAx applications typically require that a single user assume ownership and control of a design or engineering model (e.g. a file or database record) in order to prohibit multiple users from making uncoordinated changes to the model.

BRIEF SUMMARY OF THE INVENTION

The present invention has been developed in response to the present state of the art, and in particular, in response to the problems and needs in the art that have not yet been fully solved by currently available CAx apparatii and methods. Accordingly, the claimed inventions have been developed to provide a collaborative CAx apparatus and method that overcomes shortcomings in the art.

As detailed below, an apparatus for collaborative editing of an electronic model of a CAx object may include a datastore that stores an electronic model of an engineering object that is spatially decomposed into a plurality of editing regions. The apparatus may also include a change control module that enables a user of a plurality of concurrent users to make changes to an editable feature corresponding to a particular editing region. The change control module may also inhibit the user from making changes to an editable feature corresponding to an editing region assigned to another user.

Furthermore, a method for collaborative editing of an electronic model of a CAx object may include providing access to an electronic model that is spatially decomposed into a plurality of editing regions, enabling a user to make changes to an editable feature corresponding to a particular editing region and blocking the user from making changes to an editable feature corresponding to an editing region assigned to another user.

A variety of embodiments of the aforementioned apparatus and method are disclosed herein. It should be noted that references throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
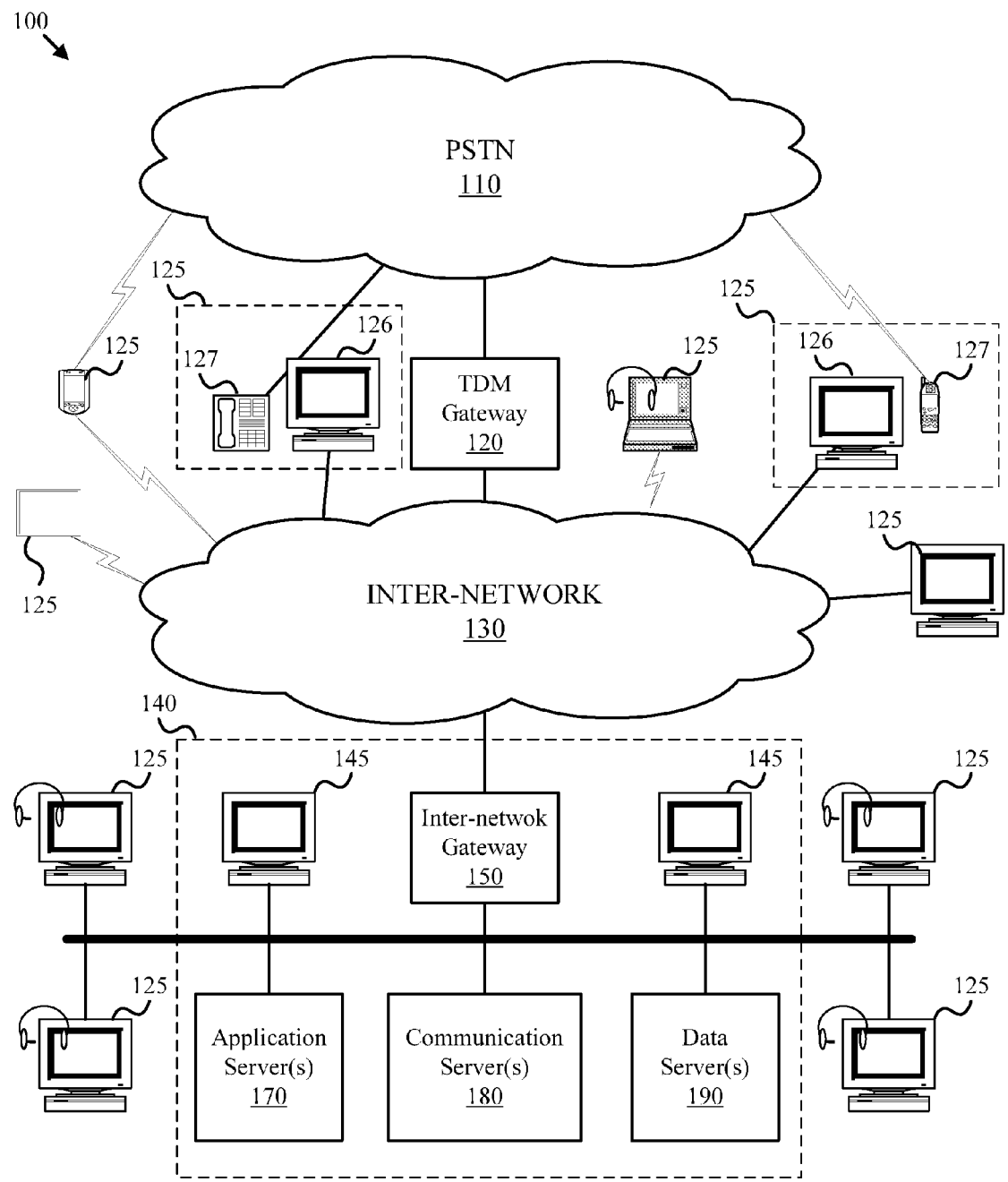
FIG. 1 is a block diagram of one example of a computing and communications infrastructure that is consistent with one or more embodiments of the claimed invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of enabling execution of a program of machine-readable instructions on a digital processing apparatus. For example, a computer readable medium may be embodied by a flash drive, compact disk, digital-video disk, a magnetic tape, a Bernoulli drive, a magnetic disk, a punch card, flash memory, integrated circuits, or other digital processing apparatus memory device. A digital processing apparatus such as a computer may store program codes, associated data, and the like on the computer readable medium that when retrieved enable the digital processing apparatus to execute the functionality specified by the modules.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used herein the phrase 'engineering object' refers to an electronically modeled object that may be edited by a CAx application or tool and 'CAx model' refers to the electronic model for that object. CAx applications and tools include, but are not limited to, design tools, meshing tools, simulation tools, visualization tools, analysis tools, manufacture planning tools, and manufacture simulation tools.

FIG. 1 is a block diagram of one example of a computing and communications infrastructure 100 that is consistent with one or more embodiments of the claimed invention. As depicted, the infrastructure 100 includes various systems, subsystems, and networks such as a public switched telephone network (PSTN) 110, a TDM gateway 120 connecting the PSTN to an inter-network 130, a variety of workstations 125, a data center 140 with administrative terminals 145, an inter-network gateway 150 connecting a local area network to the inter-network 130, and various servers such as application servers 170, communication servers 180, and data servers 190. The infrastructure 100 is one example of components that can be operably interconnected to provide an infrastructure for a collaborative CAx system.

Each workstation 125 may include a separate computing device 126 and a communications device 127 or the computing device and communications device may integrated into the workstation 125. The computing devices 126 may enable graphical editing and viewing of CAx models. The communications devices 127 may enable users to communicate with other users that are concurrently editing a CAx model.

The inter-network 130 may facilitate electronic communications between the various workstations and servers. In one embodiment, the inter-network 130 is the internet. In another embodiment, the inter-network 130 is a virtual private network (VPN).

Various servers such as blade servers within the data center 140 function cooperatively to facilitate concurrent collaborative editing of CAx models by local and remote users. For example, the application servers 170 may provide one or more collaborative CAx applications to the local and remote users. Some users may have the collaborative CAx applications installed on their local computing devices 126.

The communication servers 180 may facilitate communications between the users through various channels or services such as VOIP services, email services, instant messaging services, short message services, and text messaging services. The workstations 125 may leverage such services for user to user communications via the communication servers 180 or via other available service platforms.

The data servers 190 or the like may store CAx models of design or engineering objects within various model files or records. The data servers may replicate copies of the models for use by various users. Some users may have a local copy of a model. As described herein, instead of requiring a particular user to assume control of a model file or record, updates to the model may be coordinated by one or more collaborative CAx applications including client versions, server versions, and cloud versions of such applications.

Figure 2:
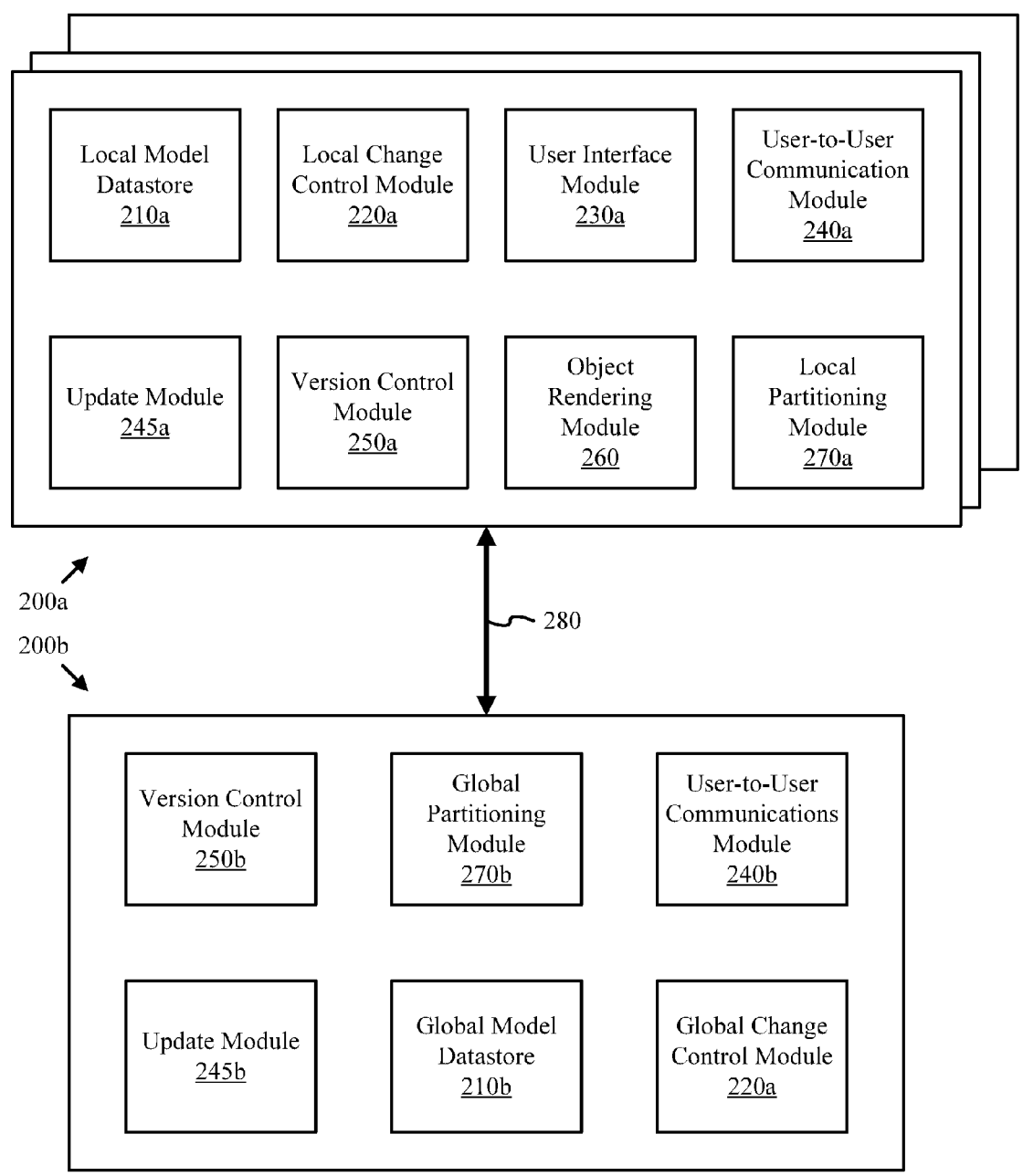
FIG. 2 is a block diagram of one example of a collaborative CAx editing system that is consistent with one or more embodiments of the claimed invention.

FIG. 2 is a block diagram of one example of a collaborative CAx editing system 200 that is consistent with one or more embodiments of the claimed invention. As depicted, the collaborative CAX editing system 200 includes a variety of modules including a model datastore 210, a change control module 220, a user interface module 230, a user-to-user communication module 240, a version control module 250, an object rendering module 260, and a partitioning module 270. Each of the modules may reside on a single computing device (i.e. node) or be collaboratively partitioned onto multiple devices or nodes. For example, the depicted embodiment includes a client node 200a where the various modules are appended with the reference letter 'a' and a server node 200b where the modules are appended with the reference letter 'b'. The modules may be primarily or wholly comprised of software codes and associated data that are executed and processed by a digital processing apparatus such as a computer to provide the specified functionality.

The model datastore 210 stores data for the node(s) 200. The model datastore 210 may include an actual storage device or act as an interface to a storage device. In particular, the model datastore 210 may enable the nodes 200 to store and retrieve files or other units of data such as database records that correspond to an electronic model (i.e. CAx model) of an engineering object. The model datastore 210 may include working memory on the node 200.

In one embodiment, the local model datastore 210a contains local copies of CAx models managed by the global model datastore 210b. The local and global model datastores may coordinate together to provide data coherency between local copies of the CAx models and the global copy. In certain embodiments, the global model datastore is a redundant and/or a distributed storage system.

The change control module 220 controls user access to data managed by the model datastore 210. The change control module 220 ensures that users can only access data that corresponds to features within an editing region that has been assigned to the user. All other users may be blocked by the change control module 220 from accessing data corresponding to features within the editing region that has been assigned to that user. Examples of such features include the shape, dimensions, composition, material properties and tolerances of an object, the mesh size and required accuracy for simulations, the path and tolerances for a manufacturing tool, and any other attribute that may affect the performance of a product and the manufacture thereof.

The change control module 220 may also block an update to a CAx model if the changes to an editable feature violate engineering constraints associated with the modeled engineering object. For example, if changing the material of a particular component results in an increase in mass for the engineering object beyond a designated threshold, the change to the material may be blocked by the change control module 220.

The user interface module 230 provides a user with a variety of interface elements that facilitate concurrent collaborative editing. Examples of such interface elements include interfaces elements for displaying a list of concurrent users, displaying user identifiers proximate to assigned editing regions, prioritizing user access rights and priorities (e.g. by an administrator), selecting user-to-user communication channels, initiating communication with another user, and providing access to software tools corresponding to various stages or layers associated with an engineering object.

The user-to-user communication module 240 facilitates direct communication between users. The user-to-user communication module 240 may leverage a variety of communication services such as those detailed above in the description of the computing and communications infrastructure 100. Communication may be between concurrent users as well as users that may not be actively editing an object. The interface elements provided by the user interface module 230 may enable a user to select particular users or groups as a target for a particular message or ongoing conversation. Such communication is enabled by the user-to-user communication module 240.

The update module 245 propagates changes to editable features between nodes of the collaborative editing system. The changes may be communicated via one or more communication channels 280 such as peer-to-peer communication channels, client-server communication channels, and data replication channels associated with a cloud computing environment. In the depicted embodiment, valid changes to a local copy of an engineering model are communicated by the client update module 245a to the server update module 245b within the server node 200b. In turn, the server update module 245b may update additional client nodes 200a.

The version control module 250 provides revision control capabilities to the collaborative editing environment. For example, the version control module in conjunction with the user interface module may enable the concurrent users to select which revision of a product is to be updated with the edits. In certain embodiments, multiple revisions may be simultaneously edited. Revision control may also allow the collaborative users to discard edits associated with an editing session.

The object rendering module 260 renders the engineering object on a display for viewing by the user. The user interface module 230 may overlay interface elements such as control points on the rendered engineering object.

The partitioning module 270 partitions the engineering object into one or more editing regions. The partitioning may occur via spatial decomposition. The partitioning may be automatic, for example when an engineering object is opened for editing, or user driven, for example in response to a user selecting a region or particular elements or features for editing. In some embodiments, the local partitioning modules 270a initiate the partitioning process but the actual partitioning is performed by the global partitioning module 270b or a process under control of the global partitioning module 270b.

Figure 3:
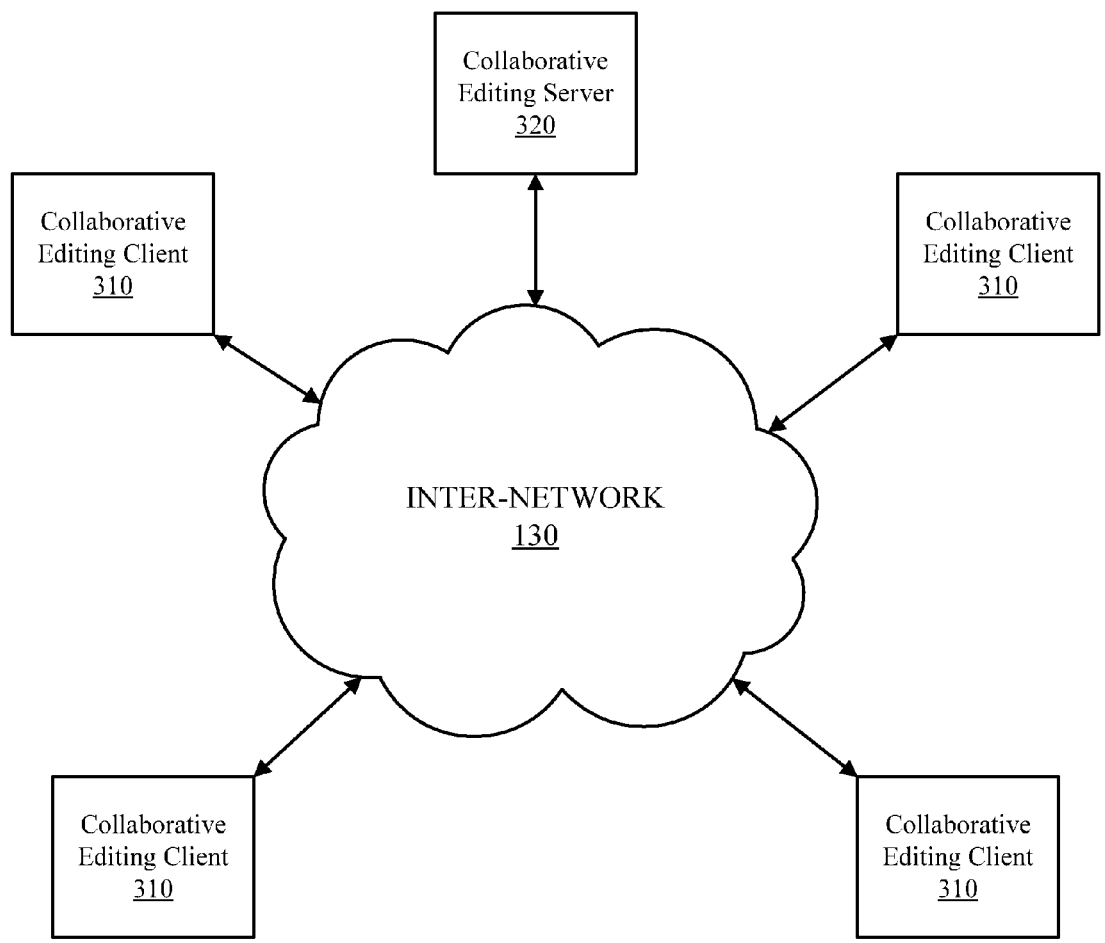
FIGS. 3-5 are block diagrams of several embodiments of the collaborative CAx editing system of FIG. 2 as applied to various computing architectures.
Figure 4:
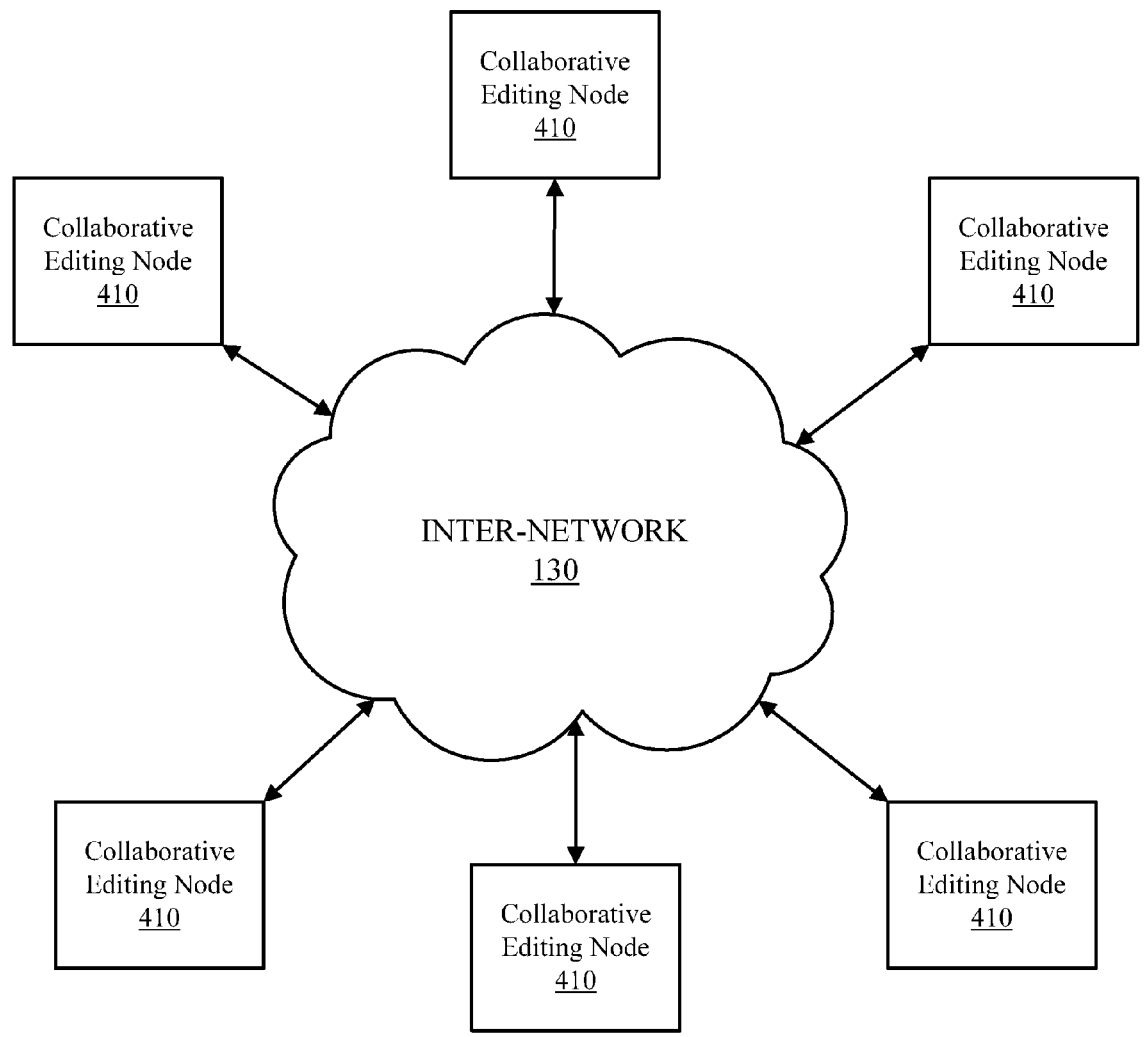
Figure 5:
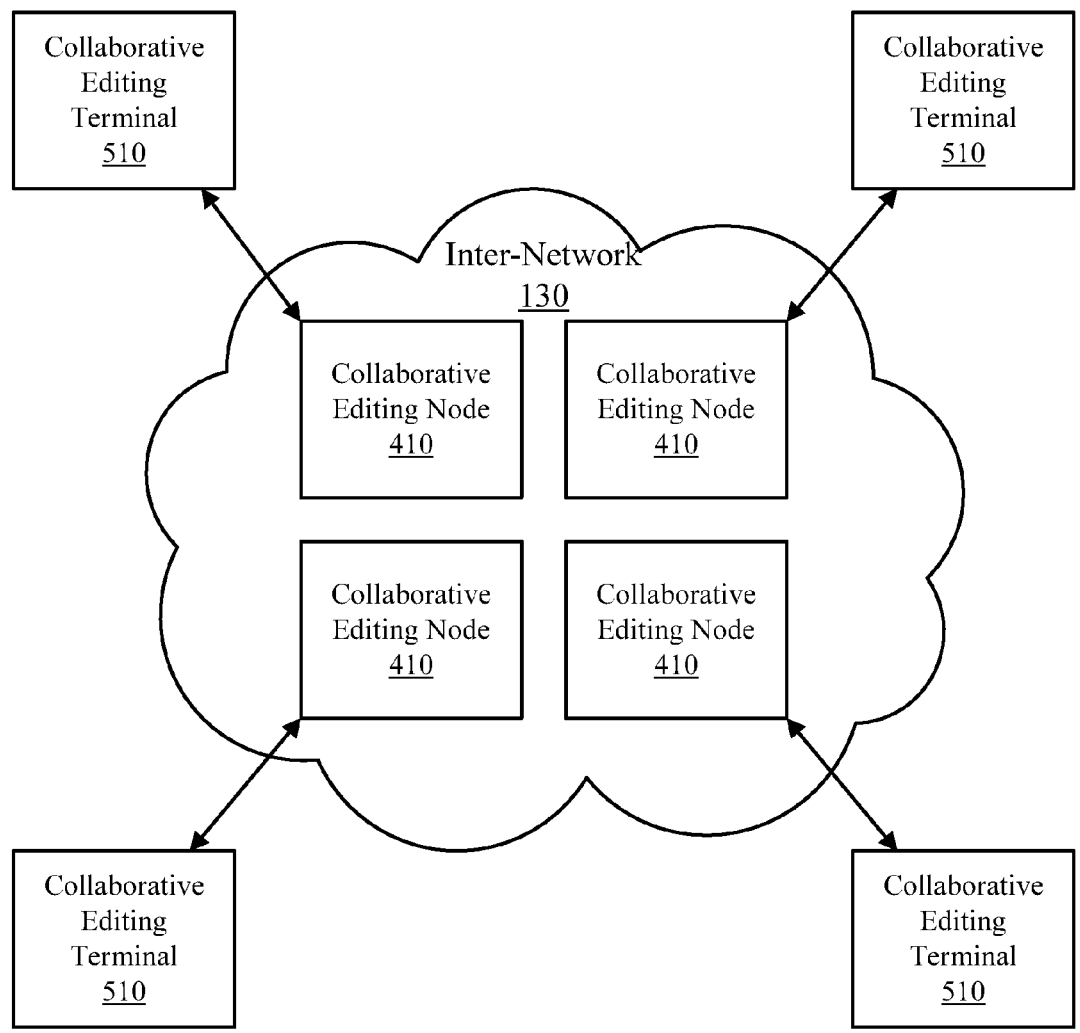

FIGS. 3-5 are block diagrams of several embodiments of the collaborative CAx editing system of FIG. 2 as applied to various computing architectures. FIG. 3 depicts one example of a client-server embodiment, FIG. 4 depicts one example of a peer-to-peer embodiment, and FIG. 5 depicts one example of a cloud embodiment. It should be noted that a variety of computing architectures beyond those shown in FIGS. 3-5 including emerging architectures may provide a computing infrastructure suitable for the collaborative CAx editing disclosed herein.

The client-server embodiment depicted in FIG. 3 includes a number of collaborative editing clients 310 that are in communication with a collaborative editing server 320. In one embodiment, the client 310 is the node 200a depicted in FIG. 2 and the server 320 is the node 200b. However, one of skill in the art will appreciate the modules shown in FIG. 2 may be partitioned between the client 310 and the server 320 in any useful manner that facilitates collaborative editing.

The peer-to-peer embodiment depicted in FIG. 4 includes a number of collaborative editing nodes 410. In the depicted embodiment, each collaborative editing node includes all of the modules of the client node 200a along within distributed versions of the modules of the server node 200b. In another embodiment, each module of the server node 200b is assigned to a particular collaborative editing node 410.

The cloud embodiment depicted in FIG. 5 includes a number of collaborative editing nodes 410 similar to the peer-to-peer embodiment of FIG. 4. However, the collaborative editing nodes may be part of the inter-network 130 or one or more data centers 140 attached to the inter-network 130. In the depicted embodiment, users access a collaborative CAx application via a collaborative editing terminal 510. In one embodiment, the collaborative editing terminal 510 is a thin client that only includes the modules of FIG. 2 (or portions thereof) that are necessary to support user interaction.

Figure 6:
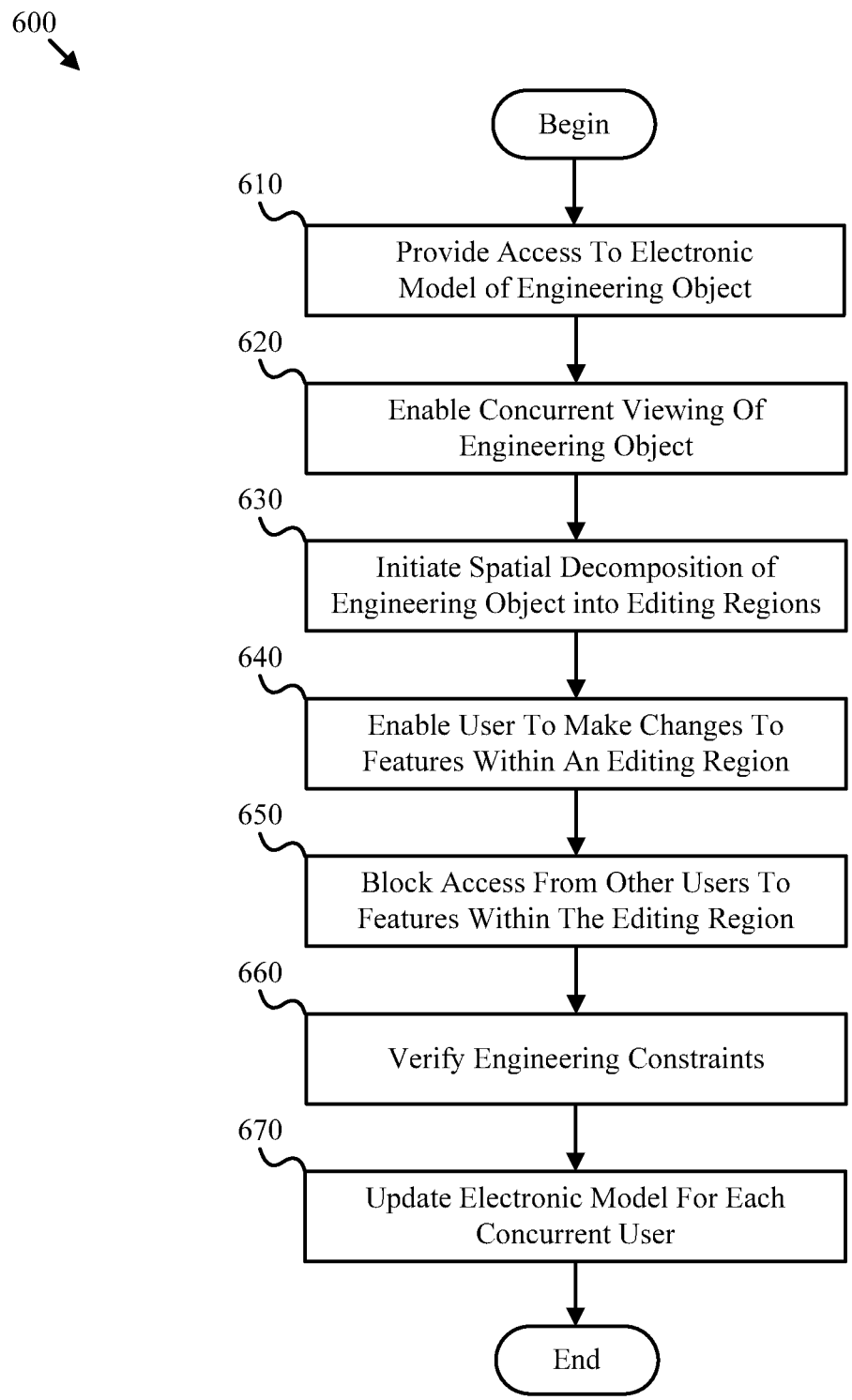
FIG. 6 is a flowchart diagram of one example of a collaborative CAx editing method that is consistent with one or more embodiments of the claimed invention.

FIG. 6 is a flowchart diagram of one example of a collaborative CAx editing method 600 that is consistent with one or more embodiments of the claimed invention. As depicted, the collaborative CAx editing method 600 includes providing access 610, enabling concurrent viewing 620, initiating 630 spatial decomposition, enabling changes 640 by a user, blocking access 650 from other users, verifying 660 any engineering constraints, and updating 670.

Providing access 610 may include providing an engineering model or a copy thereof to various computing devices or nodes associated with collaborative users. Enabling concurrent viewing 620 may include providing tools or modules for rendering the engineering model to the collaborative users.

Initiating 630 spatial decomposition may include local or remote invocation of a function that spatially decomposes the engineering object into a plurality of editing regions. In some embodiments, the editing regions are automatically generated. In other embodiments, regions are established in response to users selecting a feature for editing. In such embodiments, the partitioning module 270 may check dependencies between geometries and features and allocate one or more spatial regions that encompasses all of the geometries (or the like) affected by a change to a feature. For example, an engineering object may have mounting holes for securing the object within a product. Editing a mounting hole spacing parameter or feature for the engineering object may cause the partitioning module 270 to allocate one or more editing regions (to the collaborative user) that encompasses each geometry affected by the hole spacing.

Enabling changes 640 by a user and blocking access 650 from other users may include allowing users to make changes to features within editing regions assigned to them while preventing users from making changes to features within editing regions that are not assigned to them.

Verifying 660 any engineering constraints may include determining if the changes to the editable features violate constraints placed upon an engineering object. For example, an engineering object may have size, weight, and power (SWAP) constraints that need to be met. The change control module 220 may verify that such constraints are met and block changes when such constraints are not met.

Updating 670 may include updating the electronic model for an engineering object and each copy thereof. Updating may be coordinated by the update modules 245 to ensure a reasonable degree of coherency between all copies of the electronic model. One of skill in the art will appreciate that the granularity and frequency of updates may be adjusted to reduce data traffic between nodes. For example, while a collaborative user is sizing a particular geometry with a mouse, it may not be desirable to propagate changes to the geometry size to other collaborative nodes and users. In one embodiment, changes to a feature or geometry are not propagated to other nodes until another feature or geometry is selected or the user initiates a save function.

One of skill in the art will also appreciate that the granularity and frequency of updates may be a factor in how frequently a user may be blocked from editing a feature or geometry. For example, frequent updates of relatively small regions may enable multiple users to sequentially gain access to a common working region and thereby reduce the probability of blocking. In one embodiment, an editing region is released for access by any user when the changes to a feature or geometry are propagated to other nodes.

Figure 7:
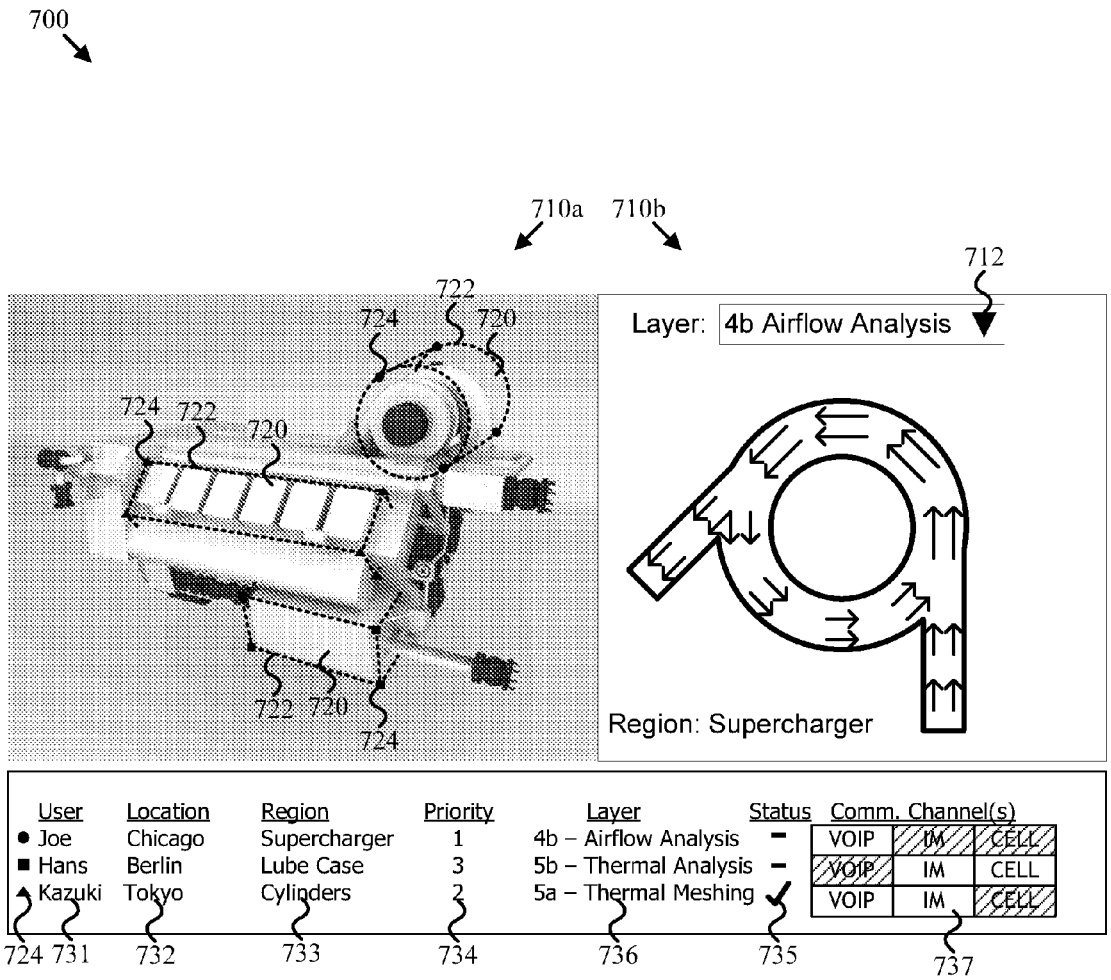
FIG. 7 is a graphical and textual depiction of one example of a collaborative CAx user interface that is consistent with one or more embodiments of the claimed invention.

FIG. 7 is a graphical and textual depiction of one example of a collaborative CAx user interface 700 that is consistent with one or more embodiments of the claimed invention. As depicted, the user interface 700 includes a graphical rendering 710 with editing regions 720 and a concurrent user list 730. The user interface 700 facilitates collaborative user editing of electronic models of engineering objects.

The graphical rendering 710 provides a graphical rendering of an engineering object and/or layer associated therewith. The graphical rendering may be a 2D or 3D rendering from a variety of perspectives that facilitates editing. In the depicted embodiment, the graphical rendering includes a perspective CAD rendering 710*a* and a cross-sectional analysis rendering 710*b* for a region assigned to the user of the interface 700 (i.e. 'Joe').

The editing regions 720 may be demarcated with boundaries 722 and marked with user identifiers 724 that indicate generally the extents of the region and which user the region has been assigned to. Although the depicted extents do not overlap each other, the spatial decomposition process may result in distinct regions whose extents do overlap. An editing region may also be spatially disjoint. For example, an electronic model for an airplane may be partitioned into a cabin interior region, a fuselage exterior region, and a region for the aircraft wings. In some embodiments, graphical renderings within each region are color coded or coded in some other way such as a shading pattern to indicate which user they are assigned to.

In the depicted embodiment, a layer selector 712 (e.g. a drop-down list) enables a collaborative user to select the layer that is to be edited or viewed for an assigned editing region. Software tools that are specific to the selected layer (not shown) may be made available or activated on the user interface 700 in response to layer selection. Examples of such software tools include visualization tools, design tools, meshing tools, simulation tools, analysis tools, manufacture planning tools, and manufacture simulation tools.

The concurrent user list 730 may provide a variety of information relative to collaborative editing such as user names 731 and locations 732, a region name 733, a user priority 734, a region status 735, a layer indicator 736, and a channel indicator/selector 737. The user names 731 may correspond to a particular user identifier 724. The location 732 may indicate the physical location of the user and thereby enhance coordination and communication.

The region name 733 may be derived from information within the electronic model or specified by a user upon assignment or selection. The user priority 734 may be used to determine which user a region should be assigned to if multiple users attempt to edit the same region. In one embodiment, a higher priority user can assume control of an editing region assigned to a lower priority user. The region status 735 may indicate the status of editing or analysis for the region such as a 'pending' indicator 735*a* and a 'completed' indicator 735*b*. The layer indicator 736 may indicate the layer that the user is currently editing. The channel indicator/selector 737 may provide a visual indication of which communication channels are available for communication with each user and enable selection of particular channels for use in communicating with one or more users.

The various interface elements of the collaborative user interface 700 function cooperatively to facilitate productive collaborative editing of electronic models of engineering objects. The proceeding depiction of the collaborative user interface 700 and other inventive elements described herein are intended to be illustrative rather than definitive. Similarly, the claimed invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for collaborative editing of an electronic model of an engineering object, the apparatus comprising:
    a model datastore configured to store an electronic model, or a copy thereof, for an engineering object;
    a change control module configured to enable a user of a plurality of concurrent users to make changes to an editable feature of the engineering object;
    a partitioning module configured to initiate spatial decomposition of the engineering object in response to selection of the editable feature of the engineering object by the user, wherein spatial decomposition comprises allocating an editing region that encompasses the geometries that are dependent on the editable feature and would be affected by a change to the editable feature; and
    the change control module further configured to block all other users from making changes to any editable feature corresponding to the new editing region.

2. The apparatus of claim 1, wherein the change control module is further configured to initiate an update of the electronic model with the changes to the editable feature.

3. The apparatus of claim 2, further comprising an update module configured to propagate the changes to the editable feature via a communication channel selected from the group consisting of a peer-to-peer communication channel, a client-server communication channel, and a data replication channel for a cloud server.

4. The apparatus of claim 1, further comprising a user-to-user communication module configured to provide a communication channel the user for communicating with at least one other user of the plurality of concurrent users.

5. The apparatus of claim 1, further comprising a user interface module configured to display an indicator proximate to the new editing region that indicates which concurrent user is assigned to the new editing region.

6. The apparatus of claim 5, wherein the user interface module is further configured to provide at least one interface element that provides the user with access to software tools corresponding to multiple layers of a multi-layered product development process concurrent with editing the engineering object.

7. The apparatus of claim 6, wherein the software tools are selected from the group consisting of visualization tools, design tools, meshing tools, simulation tools, analysis tools, manufacture planning tools, and manufacture simulation tools.

8. The apparatus of claim 6, wherein the user interface module is further configured to provide at least one interface element that provides the user with access to software tools corresponding to multiple layers of a multi-layered product development process.

9. The apparatus of claim 6, wherein the user interface module is further configured to provide an interface element that enables the user to indicate completion of a particular layer of the multi-layered development process for the new editing region.

10. The apparatus of claim 6, wherein the user interface module and the change control module are further configured to enable concurrent users to concurrently make changes to different editing regions, wherein the changes correspond to different layers of the multilayered development process.

11. The apparatus of claim 5, wherein the user interface module is further configured to visually demarcate the new editing region with boundaries that indicate generally the extents of the new editing region.

12. The apparatus of claim 1, wherein the partitioning module is further configured to initiate spatial decomposition of the engineering object in response to user input.

13. The apparatus of claim 1, wherein the partitioning module is further configured to automatically initiate spatial decomposition of the engineering object.

14. The apparatus of claim 1, wherein the change control module is further configured to assign the new editing region to a user previously blocked from making changes.

15. The apparatus of claim 1, wherein the partitioning module is further configured to initiate decomposition of the engineering object into layers corresponding to different layers of a multi-layered development process.

16. The apparatus of claim 1, wherein the change control module is further configured to determine, in response to user selection of the editable feature of the engineering object, the geometries that are dependent on the editable feature and would be affected by a change to the editable feature.

17. A method to for collaborative editing of an electronic model of an engineering object, the method comprising:
   providing access to an electronic model, or a copy thereof, of an engineering object;
   enabling a user to make changes to an editable feature of the engineering object;
   initiating spatial decomposition of the engineering object in response to selection of the editable feature of the engineering object by the user, wherein spatial decomposition comprises allocating a new editing region that encompasses the geometries that are dependent on the editable feature and would be affected by a change to the editable feature; and
   blocking all other users from making changes to any editable feature corresponding to the new editing region.

18. The method of claim 17, further comprising initiating an update of the electronic model with the changes to the editable feature.

19. The method of claim 17, further comprising communicating the changes to the editable feature via a communication channel selected from the group consisting of a peer-to-peer communication channel, a client-server communication channel, and a data replication channel.

20. The method of claim 17, further comprising displaying a concurrent users list.

21. The method of claim 17, further comprising providing an interface element that enables the user to initiate communication with another user of a plurality of concurrent users.

22. The method of claim 17, further comprising communicating with at least one other user of a plurality of concurrent users.

23. The method of claim 17, further comprising displaying an indicator proximate to an editing region that indicates which user is assigned to that editing region.

24. The method of claim 17, wherein spatial decomposition of the engineering object is initiated in response to user input.

25. The method of claim 17, wherein spatial decomposition of the engineering object is initiated automatically.

26. The method of claim 17, further comprising providing access to software tools corresponding to multiple layers of a multi-layered product development process.

27. The method of claim 26, wherein the software tools are selected from the group consisting of visualization tools, design tools, meshing tools, simulation tools, analysis tools, manufacture planning tools, and manufacture simulation tools.

28. The method of claim 17, further comprising providing an interface element that enables the user to indicate completion of a particular layer of the multi-layered development process for the new editing region.

29. The method of claim 17, further comprising enabling concurrent users to concurrently make changes to different editing regions, wherein the changes correspond to different layers of a multi-layered development process.

30. The method of claim 17, further comprising assigning the new editing region to a user previously blocked from making changes.

31. The method of claim 17, further comprising initiating decomposition of the engineering object into layers corresponding to different layers of a multi-layered development process.

32. The method of claim 17, further comprising visually demarcating the new editing region with boundaries that indicate generally the extents of the new editing region.

33. The method of claim 17, further comprising determining, in response to user selection of the editable feature of the engineering object, the geometries that are dependent on the editable feature and would be affected by a change to the editable feature.

* * * * *